Feb. 8, 1966  K. R. LAGLER ETAL  3,233,752
AUTOMATIC POSITIONING AND ORIENTING APPARATUS
Filed June 29, 1964
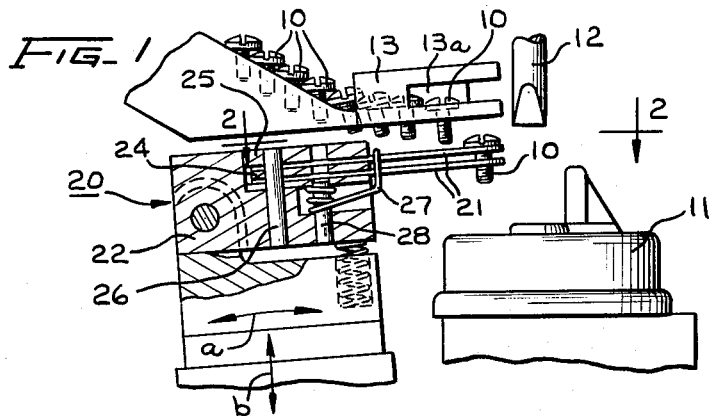
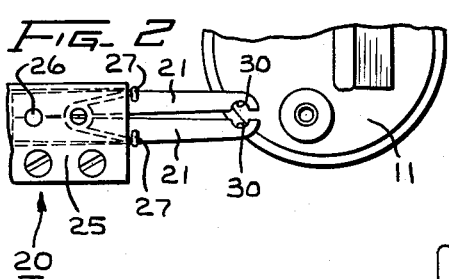
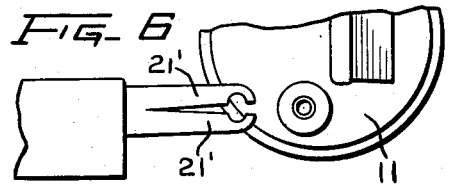
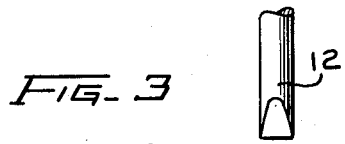
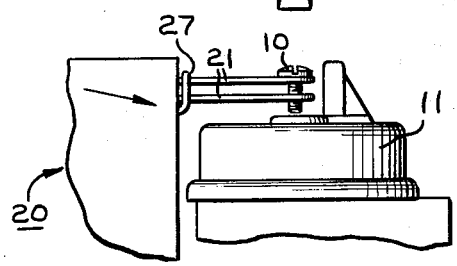
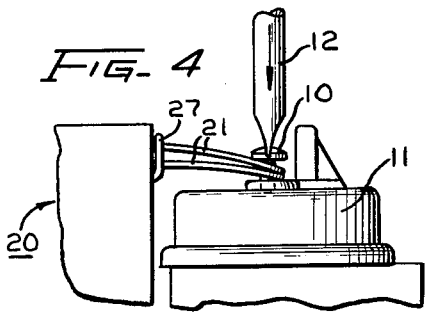
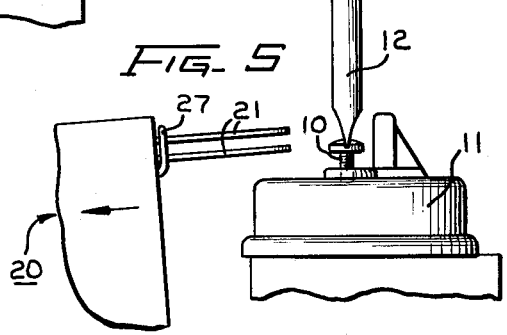
INVENTORS
K.R. LAGLER
A.L. VAN NEST
BY
ATTORNEY

United States Patent Office 3,233,752
Patented Feb. 8, 1966

---

3,233,752
AUTOMATIC POSITIONING AND ORIENTING APPARATUS
Karl R. Lagler and Arden L. Van Nest, Indianapolis, Ind., assignors to Western Electric Company, Incorporated, New York, N.Y., a corporation of New York
Filed June 29, 1964, Ser. No. 378,904
4 Claims. (Cl. 214—1)

This invention relates to automatic positioning and orienting apparatus, and more particularly to apparatus for placing and maintaining successive headed fasteners in accurate position and orientation with respect to successive articles for insertion of the fasteners into the articles. It is an object of the invention to provide improved apparatus of such character.

In the automatic assembly of many forms of apparatus, it is a common requirement that headed fasteners of various types be automatically positioned and oriented with respect to an article for insertion therein. Previously known apparatus for performing this function has commonly been unreliable in operation, particularly where the shank of the headed fastener is of substantial length, because of failure to maintain proper orientation of the fastener throughout at least the initial portion of the actual insertion of the fastener into the article. In other cases, previously known apparatus has employed fastener positioning and orienting devices which are directly associated with the fastener inserting apparatus such that the devices are idle during the latter portion of the insertion of the fasener and during the retraction of the fastener inserting apparatus. In such cases there is necessarily a delay in operation, as compared to the case wherein the fastener positioning and orienting device is independent of the fastener inserting apparatus such that the device may receive and advance a fastener while the preceding fastener is being fully inserted and during withdrawal of the inserting apparatus.

It is another object of the invention to provide improved apparatus for placing and maintaining successive headed fasteners in accurate position and orientation with respect to successive articles, wherein the fasteners are engaged and substantially confined at spaced points along the length of its shank portion.

It is a further object of the invention to provide improved apparatus of the character described immediately above which is capable of continued maintenance of fasteners position and orientation until the fastener is partially inserted.

Another object of the invention is to provide improved apparatus of the character described above wherein the fastener positioning and orienting apparatus is independent of an associated fastener inserting device such that it is free to receive and advance another fastener while a preceding fastener is being fully inserted and during withdrawal of the inserting device.

A further object of the invention is to provide improved apparatus of the character described above while being simple in construction, and efficient and reliable in operation.

In accordance with a preferred embodiment of the invention each successive headed fastener is received and supported by two pairs of fingers. The fingers are supported on a carriage for movement between a fastener receiving position and a fastener inserting position. Each pair of fingers defines an opening therebetween, adjacent the free ends of the fingers for receiving and confining the shanks of successive fasteners. The pairs of fingers are spaced apart less than the length of the shank of the fastener such that a fastener may be supported at two spaced points along the length of its shank, with the head of the fastener engaging one pair of fingers. The pair of fingers which engages the head of the fastener is flexible in the direction of fastener insertion such that the two pairs of fingers may continue to hold the fastener in proper orientation during the initial insertion of the fastener into an article. The free ends of each pair of fingers are yieldable relatively away from each other so that the carriage may withdraw the fingers laterally from the partially inserted fastener to permit complete insertion.

This invention together with further objects and advantages thereof, will best be understood by reference to the following description taken in connection with the accompanying drawing, in which FIG. 1 is a side elevational view, partially in cross section, of a portion of a screw inserting machine incorporating apparatus embodying the invention;

FIG. 2 is a plan view of the apparatus embodying invention taken along the line 2—2 of FIG. 1;

FIG. 3 is a side elevational view of a portion of the machine shown in FIG. 1 but illustrating the apparatus in screw inserting position;

FIG. 4 is a view similiar to FIG. 3 but showing the screw partially inserted;

FIG. 5 is a view similar to FIGS. 3 and 4 but showing the screw positioning apparatus withdrawn, and FIG. 6 is a view similar to FIG. 2 but illustrating a different embodiment of the invention.

The function of the machine shown in part in FIG. 1 is to insert screws 10 in a succession of articles 11 by means of a power operated screw driver whose bit 12 is seen in FIG. 1. The article 11 in an actual embodiment of the invention is a cup-like housing for the transmitter of a telephone. The function of the apparatus embodying the invention and incorporated in the machine is to transfer successive screws 10 from a screw dispenser 13 (the screw receiving station) to a position immediately above the article 11 and below the screw driver bit 12 (the screw inserting station).

This apparatus, generally designated by the reference numeral 20, includes two pairs of fingers 21 and a carriage 22. The carriage is arranged for automatic movement along an arcuate path suggested by the arrow "a" and along a linear path suggested by the arrow "b." Since the apparatus for producing the necessary movements of the carriage 22 may be conventional in form and does not constitute a feature of the present invention, it is not shown or described herein.

The carriage 22 is recessed at its upper right-hand corner as viewed in FIG. 1, and within this recess there are placed two fingers 21 comprising a lower pair, a spacer 24, and two more fingers 21 comprising an upper pair. A cover plate 25 holds these parts within the recess.

A pin 26 is arranged within openings provided for the purpose, this pin serving as a pivot point for all four of the fingers 21. A spring 27 is arranged below the lower fingers 21, and a pin 28 is arranged within openings provided for the purpose such that it may serve to anchor the main body of the spring. As is seen best in FIG. 2, the spring 27 includes arms which extend upwardly alongside the fingers 21 and urge the free ends of the fingers of each pair toward each other.

Near the free ends of the fingers 21 notches 30 are provided which are of such configuration that with the paired fingers 21 in their normal relative positions, the two pairs of fingers define aligned openings which may receive and confine the shank of a screw 10.

More specifically, the shank of a screw 10 can freely enter the aligned openings defined by the two pairs of fingers from a position above the fingers. However, the fingers 21 extend far enough about the shank of a screw which is arranged within the defined opening that the screw is restrained against movement in all directions laterally of itself.

Any one of many suitable devices may be employed to feed the screws 10 in sequence to the apparatus 20, and more particularly to the aligned openings defined by the fingers 21. As will be apparent to those skilled in the art, the device shown in part in FIG. 1 employs gravity feed of the screws down to a lower level.

In order that the lowermost screw may be laterally displaced from the line of following screws, a plunger 13a may be employed to move the lowermost screw laterally. This facilitates the acceptance of the lowermost screw by the fingers 21 without interference on the part of the following screws. In view of the fact that a dispensing device, such as that required for automatic feeding of the apparatus 20, is common in the art and does not of itself constitute a feature of the present invention, a detailed description is not included herein.

With a single screw 10 isolated in the manner suggested above, the apparatus 20 is swung to position the aligned openings defined by the fingers 21 below and in alignment with the shank of the isolated screw 10. The apparatus 20 is then raised such that the openings defined by the fingers 21 encircle the shank of the isolated screw.

The apparatus 20 is then swung to the right, carrying the isolated screw 10 within the aligned openings between the fingers, a slot, not shown, being provided in the lower floor of the dispenser 13 to permit passage of the isolated screw to the right and out of the dispenser.

When the apparatus 20 has swung to the right such that the screw 10 carried by the fingers is located directly above the threaded opening in the article 11, the apparatus 20 is lowered to the position illustrated in FIG. 3. The screw driver bit 12 may then be lowered to depress the screw against the article 11, and may be rotated such that the bit 12 enters the slot in the screw head and rotates the screw to initiate threading of the screw into the article 11.

This is a critical part of the cycle. The rotating screw driver bit presumably does not enter the screw slot until after some substantial portion of a revolution of the screw driver. During the depression of the screw against the article and the initial rotation of the screw driver bit, there is substantial agitation of the screw. If the screw is not well confined both as to position and orientation, the screw has a substantial tendency to become improperly positioned or oriented.

Since the free ends of the fingers 21 encircle the shank of the screw sufficiently that the screw is restrained from moving out of the defined opening, and since the two pairs of fingers thus confine the shank of the screw at two spaced points, the screw is not only restrained from becoming improperly positioned but is also held firmly in proper orientation. Since the upper pair of fingers 21 may flex downward, as illustrated in FIG. 4, both pairs of fingers of the illustrated apparatus remain in engagement with the shank of the screw and provide continued positioning and alignment of the screw. Preferably the lower fingers may also flex in the vertical direction, as shown in FIG. 4, such that the positioning of the fingers and the timing of operations need not be as critically controlled as would otherwise be necessary.

With the screw 10 sufficiently seated in the article 11 that it is firmly positioned and aligned thereby, the apparatus 20 is swung to the left, withdrawing the fingers 21 from about the shank of the screw. The apparatus 20 is then free to rise and receive the next-in-sequence screw during the time that the screw driver is fully inserting the screw and withdrawing to the position of FIG. 1.

As indicated above, the apparatus for providing the necessary movements of the assembly 20 may be of conventional form and does not of itself constitute a feature of the present invention, and accordingly is not shown or described herein. For the purpose of understanding the present invention it is sufficient to appreciate that the apparatus 20 is caused to move generally in the manner described above.

In accordance with an alternative embodiment of the invention, illustrated in FIG. 6, each pair of fingers 21' extends from a common, integral base, as shown. The slit which separates and defines the fingers is of sufficient length, in view of the thickness of the material of which the fingers are formed, that the tips of the fingers may separate, through flexibility of the fingers, to permit withdrawal of the fingers from about the shank of a partially inserted screw.

This alternative embodiment of the invention avoids the necessity of the spring 27 of the preferred embodiment of the invention, but inherently limits the degree to which the fingers 21' can confine the shank of the screw.

Apparatus has been illustrated in the drawings and described above which firmly positions and orients a succession of screws for insertion into the article 11 by the screw driver bit 12. More particularly, the shank of the screw is encircled and confined at spaced points along the length thereof. The apparatus illustrated and described is also capable of remaining in effective positioning and orienting engagement with the shank of the screw during the critical initial insertion of the screw. This follows from the fact that the upper pair of fingers is flexible in the direction of fastener insertion.

Still further, the fastener positioning and orienting apparatus is independent of the fastener inserting device such that during the final insertion of the fastener and during the withdrawal of the fastener inserting device, the fastener positioning and orienting apparatus is free to receive and advance another screw.

The illustrated embodiments of the invention are shown applied to the handling of screws. It will be apparent that the invention is applicable to the handling of any form of headed fastener including rivets, nails and tapered screws.

While various embodiments of the invention have been disclosed, many modifications will be apparent, and it is intended that the invention be interpreted as including all modifications which fall within the true spirit and scope of the invention.

What is claimed is:

1. Apparatus for placing and maintaining successive headed fasteners in accurate position and orientation with respect to successive articles for insertion of the fasteners into the articles, said apparatus comprising:

two pairs of fingers for receiving and supporting successive fasteners; and, a carriage for supporting said fingers with free ends of said fingers projecting therefrom, and for moving said fingers between a fastener receiving station and a fastener inserting station, the fingers of each pair being normally maintained in generally parallel, side-by-side relationship;

the fingers of each of said pairs having their facing edges of such contour that when in normal relative positions they define therebetween adjacent their free ends an opening for receiving and confining the shank of successive fasteners;

said carriage supporting said pairs of fingers with their openings aligned and with the pairs of fingers spaced apart by less than the length of the shank of the fasteners, whereby a fastener arranged with its shank within the openings and with its head engaging the fingers of one of said pairs is supported and is firmly maintained in desired orientation;

at least said one pair of fingers being flexible in the direction of fastener insertion whereby said one pair of fingers may yield during initial fastener insertion to permit continued alignment of the fastener by both of said pairs of fingers;

the free ends of each of said pairs of fingers being yieldable relatively away from each other to permit escape of the shank of a partially inserted fastener from said pairs of fingers when said carriage moves said fingers from fastener inserting position to fastener receiving position.

2. Apparatus for placing and maintaining successive headed screws in accurate position and orientation with respect to a power operated screw driver and successive articles for insertion of the screws into the articles by the power operated screw driver, said apparatus comprising:

two pairs of fingers for receiving and supporting successive screws; and, a carriage for supporting said fingers with free ends of said fingers projecting therefrom, and for moving said fingers between a screw receiving station and a screw inserting station, the fingers of each pair being normally maintained in generally parallel, side-by-side relationship;

the fingers of each of said pairs having their facing edges of such contour that when in normal relative positions they define therebetween adjacent their free ends an opening for receiving and confining the shank of successive screws;

said carriage supporting said pairs of fingers with their openings aligned and with the pairs of fingers spaced apart by less than the length of the shank of the screws, whereby a screw arranged with its shank within the openings and with its head engaging the fingers of one of said pairs is supported and is firmly maintained in desired orientation;

at least said one pair of fingers being flexible in the direction of screw insertion whereby said one pair of fingers may yield during initial screw insertion to permit continued alignment of the screw by both of said pairs of fingers;

the free ends of each of said pairs of fingers being yieldable relatively away from each other to permit escape of the shank of a partially inserted screw from said pairs of fingers when said carriage moves said fingers from screw inserting position to screw receiving position.

3. Apparatus as specified in claim 2, wherein said fingers are pivotally supported on said carriage, and spring means are provided for urging the free ends of the fingers of each pair toward each other.

4. Apparatus as specified in claim 2, wherein said fingers are laterally flexible to permit the escape of the shank of a screw laterally from the openings defined by the pairs of fingers.

References Cited by the Examiner
UNITED STATES PATENTS

| 2,689,589 | 9/1954 | Allen | 144—32 |
| 2,843,166 | 7/1958 | Van Alstyne | 144—32 |

References Cited by the Applicant
UNITED STATES PATENTS

| 622,476 | 4/1899 | Hubbel. |
| 1,774,630 | 8/1930 | McLaughlin. |
| 2,471,793 | 5/1949 | Stull. |

HUGO O. SCHULZ, *Primary Examiner.*